(12) United States Patent
Borghi et al.

(10) Patent No.: US 11,807,464 B2
(45) Date of Patent: Nov. 7, 2023

(54) METHOD AND SYSTEM OF FAULT PREDICTION IN A PACKAGING MACHINE

(71) Applicant: Tetra Laval Holdings & Finance S.A., Pully (CH)

(72) Inventors: Davide Borghi, Modena (IT); Luca Capelli, Novellara Reggio Emilia (IT); Jacopo Cavalaglio Camargo Molano, Solomeo di Corciano (IT); Marco Cocconcelli, Reggio Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 240 days.

(21) Appl. No.: 17/280,815

(22) PCT Filed: Sep. 20, 2019

(86) PCT No.: PCT/EP2019/075296
§ 371 (c)(1),
(2) Date: Mar. 26, 2021

(87) PCT Pub. No.: WO2020/064533
PCT Pub. Date: Apr. 2, 2020

(65) Prior Publication Data
US 2021/0403246 A1 Dec. 30, 2021

(30) Foreign Application Priority Data
Sep. 27, 2018 (EP) .................................. 18197031

(51) Int. Cl.
*G06F 11/30* (2006.01)
*B65G 43/02* (2006.01)
(Continued)

(52) U.S. Cl.
CPC .............. *B65G 43/02* (2013.01); *B65B 57/04* (2013.01); *B65G 54/02* (2013.01); *G01M 99/005* (2013.01); *B65G 2203/0283* (2013.01)

(58) Field of Classification Search
CPC ...................................................... B65G 43/02
See application file for complete search history.

(56) References Cited

U.S. PATENT DOCUMENTS 6,370,957 B1 4/2002 Filippenko et al.
6,392,584 B1 5/2002 Eklund et al.
(Continued)

FOREIGN PATENT DOCUMENTS

EP      3373211      *   9/2018
EP      3373211 A1       9/2018

OTHER PUBLICATIONS

International Search Report and Written Opinion for PCT/EP2019/075296 dated Nov. 11, 2019.
Mike Ruusunen et al. "Quality Monitoring and Fault Detection in an Automated Manufacturing System—a Soft Computing Approach." University of Oulu Control Engineering Laboratory (May 2002).
42nd European Rotorcraft Forum, 2016, vol. 1 & 2, ISBN 978-1-5108-3914-4.
(Continued)

*Primary Examiner* — Phuong Huynh
(74) *Attorney, Agent, or Firm* — Knobbe, Martens, Olson, & Bear, LLP (57) ABSTRACT

A method and system of fault prediction in a packaging machine is disclosed. The method comprises registering data values associated with the motion of independently movable objects along a track in the packaging machine; determining a distribution of the data values; calculating a measure of central tendency of the data values in the distribution; calculating a quantified measure of a shape of the distribution; associating the measure of central tendency with said quantified measure of the shape as a coupled set of condition parameters; determining a degree of dispersion of a plurality of coupled sets of condition parameters associated with a plurality of motion cycles of the independently movable objects; and comparing the degree of dispersion with a (Continued)

dispersion threshold value, or determining a trend of the degree of dispersion over time, for said fault prediction.

20 Claims, 6 Drawing Sheets

(51) Int. Cl.
  *B65B 57/04* (2006.01)
  *B65G 54/02* (2006.01)
  *G01M 99/00* (2011.01)

(56) References Cited

U.S. PATENT DOCUMENTS

| | | | |
|---|---|---|---|
| 7,026,732 B1 | 4/2006 | Backman et al. | |
| 2003/0230941 A1* | 12/2003 | Jacobs | B65G 47/841 310/12.19 |
| 2007/0282545 A1* | 12/2007 | Board | G01M 5/0041 702/56 |
| 2017/0088298 A1 | 3/2017 | McLenithan et al. | |

OTHER PUBLICATIONS

Canerini et al., "Health Monitoring of Helicopter Drive Train Components based on Support Vector Data Protection", Department of Mechanical & Aerospace Engineering, University of Rome, 2016.
European Search Opinion received in Application No. 18168558.6 published on Oct. 26, 2018.
International Preliminary Report of Patentability in PCT/EP2019/075296 dated Mar. 23, 2021.
Ogata et al., "Vibration—Based Anomaly Detection Using Flac Features for Wind Turbine Condition Monitoring", $8^{th}$ European Workshop on Structural Health Monitoring, Jul. 5-8, 2016, www.ndt.net/app_EWSHM2016.
Ono et al., Anomaly Detection of Motors with Feature Emphasis Using Only Normal Sounds, IEEE International Conference on Acousitcs, Speech and Signal Processing, 2016, pp. 2800-2804.
Purarjomandlangrudi et al., "A data mining approach for fault diagnosis: An Application of Anomaly detection algorith", Measurement, 2014, vol. 55, pp. 343-352.
Roemer et al., "Advanced Diagnostics and Prognostics for Gas Turbine Engine Risk Assessment", 2000 IEEE Aerospace Conference, Mar. 25, 2000, pp. 345-353.

* cited by examiner

METHOD AND SYSTEM OF FAULT PREDICTION IN A PACKAGING MACHINE

TECHNICAL FIELD

The present invention generally relates to the field of condition monitoring. More particularly, the present invention relates to a method of fault prediction in a packaging machine having independently moving objects, and an apparatus for predicting fault in such packaging machine or related systems for producing sealed packages.

BACKGROUND

Condition monitoring of machine components in production lines, such as in the manufacturing of sealed packages in filling—and packaging machines or related systems, is critical for ensuring a desired functionality over a period of time and fault prediction. Monitoring distortions in the movements of machine components is an essential part in achieving the desired functionality control and prevent wear-related breakdown. Distortion analysis of e.g. vibrations in bearings is an important part of industrial predictive maintenance programs so that wear and damages can be discovered and repaired before the machine breaks down, thus reducing operating and maintenance costs. More recently conveyor systems based on linear motor technology is used for manipulating packaging containers in the manufacturing of sealed packages. These conveyor systems typically comprise a closed loop track, and a plurality of movable objects or carts, which are independently moved along the track by individually controlling a plurality of solenoids along the track. The independently movable objects or carts are controlled to engage the packaging containers in various operations. Systems based on such independently movable objects pose new challenges in the field of condition monitoring and fault prediction. Empirical evaluation of vibration levels is an error-prone activity that may lead to significantly underestimate or overestimate the remaining lifetime of the components. Previous solutions to characterize bearing faults include frequency analysis, where characteristic frequency signatures are extracted from a vibration signal. Besides from being complex to implement, solutions based on frequency analysis are not always accurate and makes various assumptions with regards to the model used for the calculations, which makes fault prediction sub-optimal for the aforementioned systems utilizing independently movable objects. In particular, it is typically assumed that the motor to which the bearing is attached to rotates at a constant speed. The assumption of constant rotation speed of the servomotors is severe limitation in the field of automatic machines, in particular for objects or carts moving on a track with independent and variable speed profiles. Methods are employed to accommodate for variable speeds, but such solutions can also be complex to implement and also associated with other limitations and undesirable assumptions.

Hence, an improved condition monitoring would be advantageous and in particular allowing for avoiding more of the above-mentioned problems and compromises, including providing a less complex method of fault prediction, having short execution time and thereby enabling analysis on-the-fly, thereby allowing for a less time-consuming and robust trouble-shooting of independently movable objects.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect a method of fault prediction in a packaging machine Is provided. The packaging machine having independently movable objects configured to manipulate packaging containers, the independently movable objects communicating with a control unit configured to control the positions of the independently movable objects along a track. The method comprises registering data values associated with the motion of the movable objects along the track, determining a distribution of said data values, calculating a measure of central tendency of the data values in the distribution, calculating a quantified measure of a shape of the distribution, associating the measure of central tendency with said quantified measure of the shape as a coupled set of condition parameters, determining a degree of dispersion of a plurality of coupled sets of condition parameters associated with a plurality of motion cycles of the independently movable objects, and comparing the degree of dispersion with a dispersion threshold value, or determining a trend of the degree of dispersion over time, for said fault prediction.

According to a second aspect a system comprising a packaging machine and an apparatus configured to predict fault in the packaging machine is provided. The packaging machine having independently movable objects configured to manipulate packaging containers. The independently movable objects communicating with a control unit configured to control the positions of the independently movable objects along a track. The apparatus comprises a sensor configured to register data values associated with the motion of the movable objects along the track, and a processing unit configured to determine a distribution of said data values, calculate a measure of central tendency of the data values in the distribution, calculate a quantified measure of a shape of the distribution, associate the measure of central tendency with said quantified measure as a coupled set of condition parameters, determine a degree of dispersion of a plurality of coupled sets of condition parameters associated with a plurality of motion cycles of the independently movable objects, and compare the degree of dispersion with a dispersion threshold value, or determine a trend of the degree of dispersion over time, for said fault prediction.

According to a third aspect a computer program product comprising instructions which, when the program is executed by a computer, cause the computer to carry out the steps of the method according to the first aspect.

Further examples of the invention are defined in the dependent claims, wherein features for the second and third aspects of the disclosure are as for the first aspect mutatis mutandis.

Some examples of the disclosure provide for an improved method for predicting fault in machine components such as objects being independently movable on a track in packaging machine.

Some examples of the disclosure provide for facilitated prediction of the life-time of a machine component.

Some examples of the disclosure provide for a more predictable and efficient maintenance schedule of a machine component.

Some examples of the disclosure provide for a method of fault prediction, having short execution time and thereby enabling analysis on-the-fly.

Some examples of the disclosure provide for less time-consuming trouble-shooting of a machine component.

Some examples of the disclosure provide for improved condition monitoring in a machine such in a filling machine, having a plurality of independently movable objects.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

Figure 1:
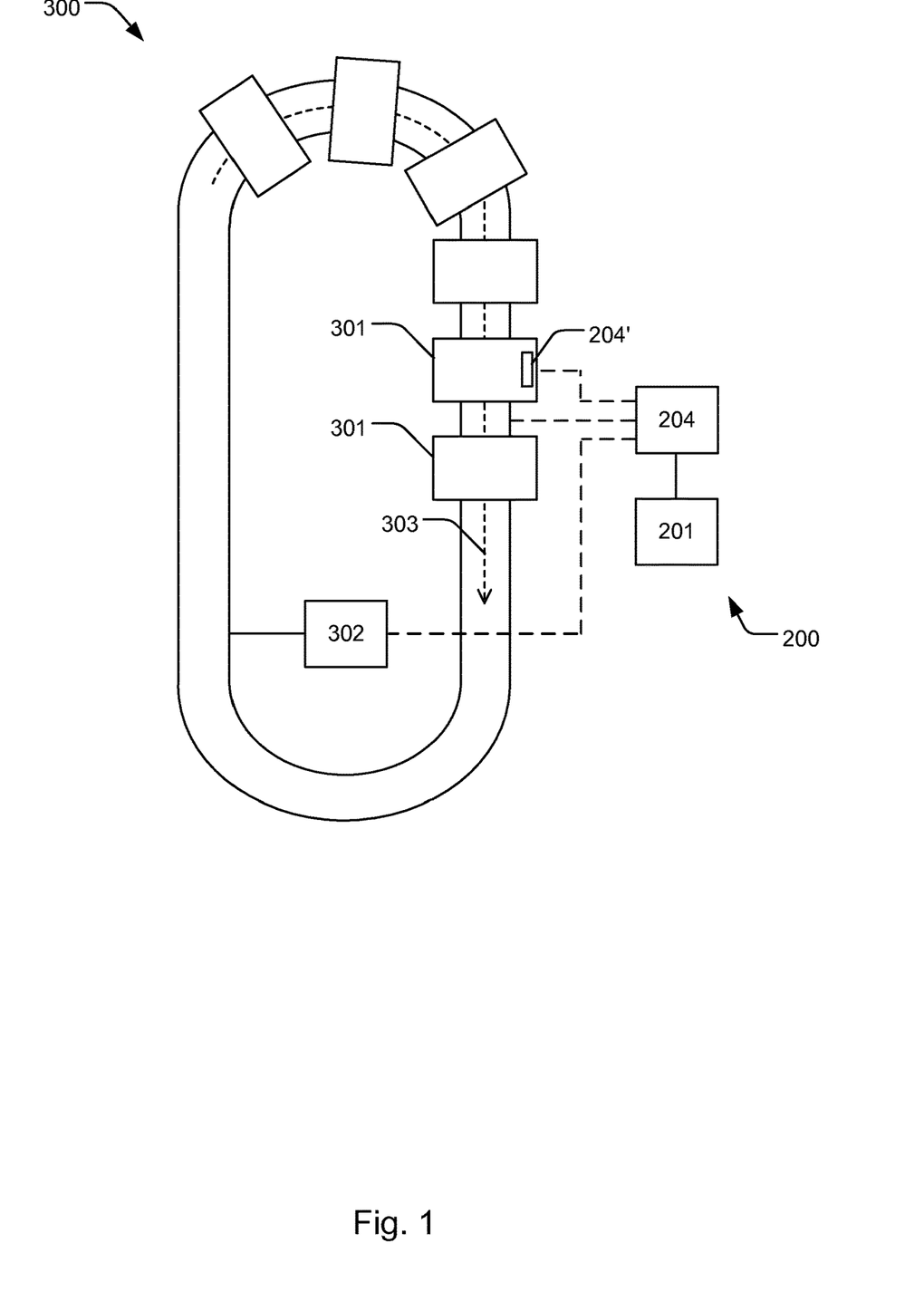
FIG. 1 is a schematic illustration of an apparatus configured to predict fault in a packaging machine having independently movable objects moving along a track.
Figure 5A:
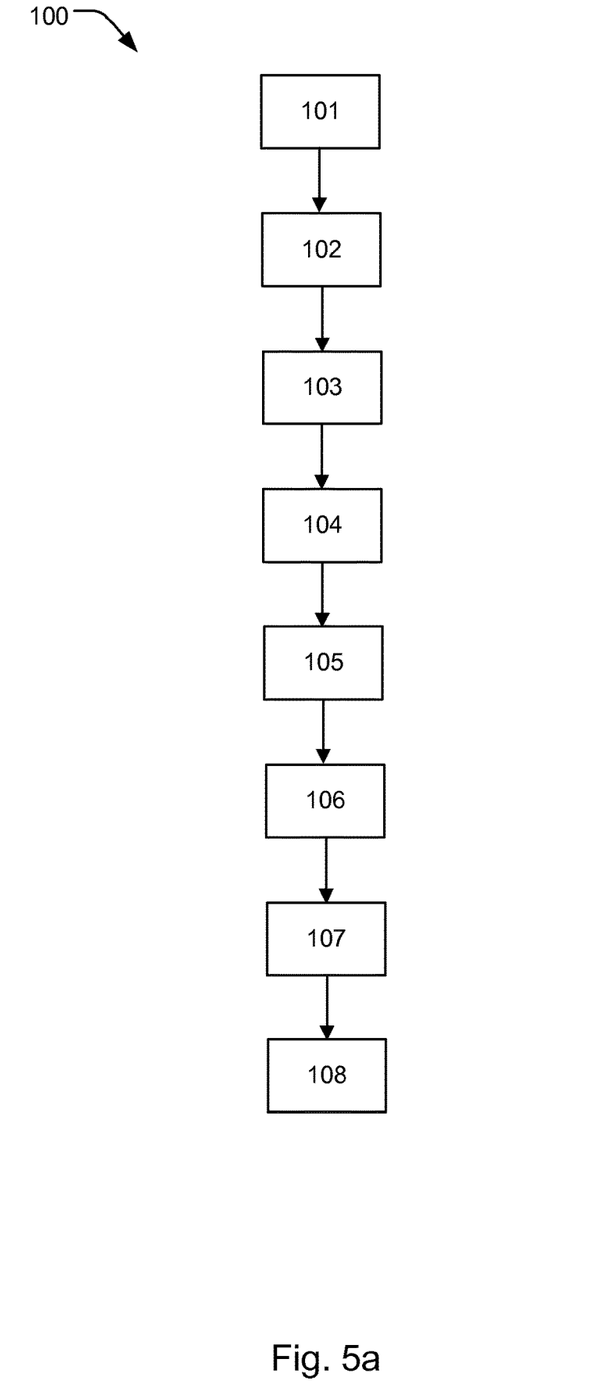
FIG. 5a is a flowchart of a method of fault prediction in a packaging machine.

FIG. 1 is a schematic illustration of an apparatus 200 configured to predict fault in a packaging machine 300 having independently movable objects 301 configured to manipulate packaging containers (not shown). The independently movable objects 301 communicate with a control unit 302 configured to control the positions of the independently movable objects 301 along a track 303. The track 303 may be an endless loop as exemplified in FIG. 1. Although the track 303 is shown as an elliptic track, it is conceivable that the track 303 may have varying shapes, i.e. extending along a variety of curves with different radiuses of curvatures. FIG. 5a illustrates a flow chart of a related method 100 of fault prediction in a packaging machine. The order in which the steps of the method 100 are described and illustrated should not be construed as limiting and it is conceivable that the steps can be performed in varying order.

Figure 2A:
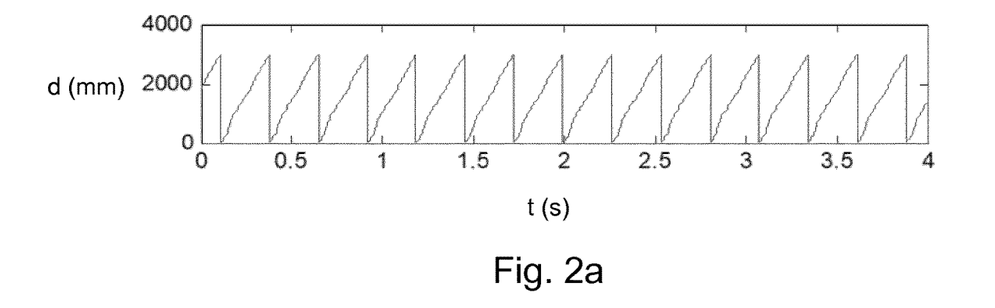
FIGS. 2a-d are diagrams illustrating data values associated with the motion of the movable objects along a track, registered by a sensor attached to the track and/or the moveable objects, including a position (2a), a velocity (2b), a position error (2c), and a current supplied to the track (2d)
Figure 2B:
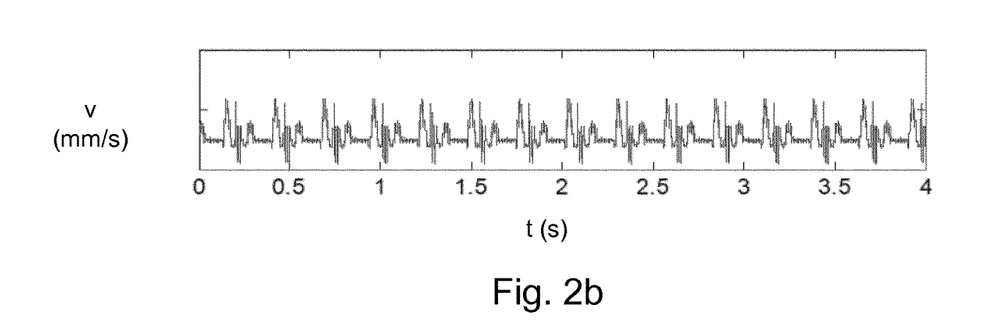
Figure 2C:
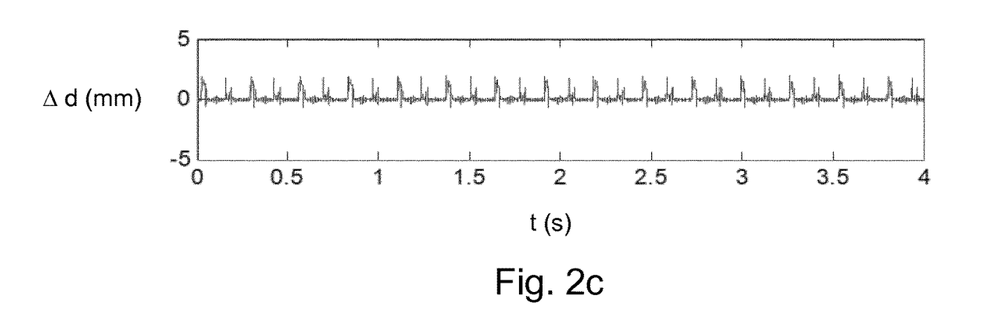
Figure 2D:
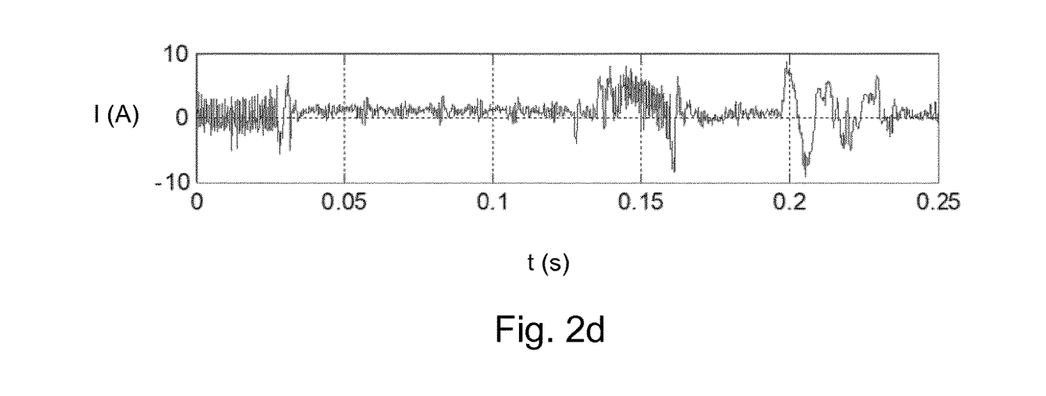
Figure 3:
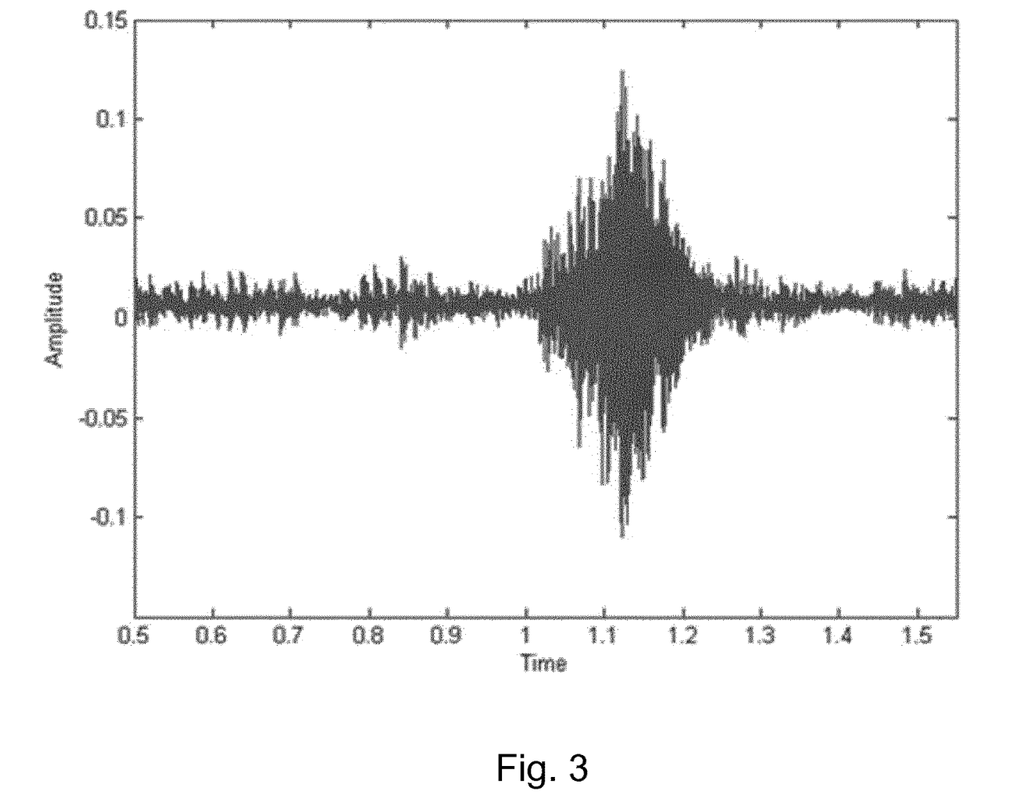
FIG. 3 is a diagram illustrating a distribution of data values associated with the motion of the movable objects along a track.
Figure 4A:
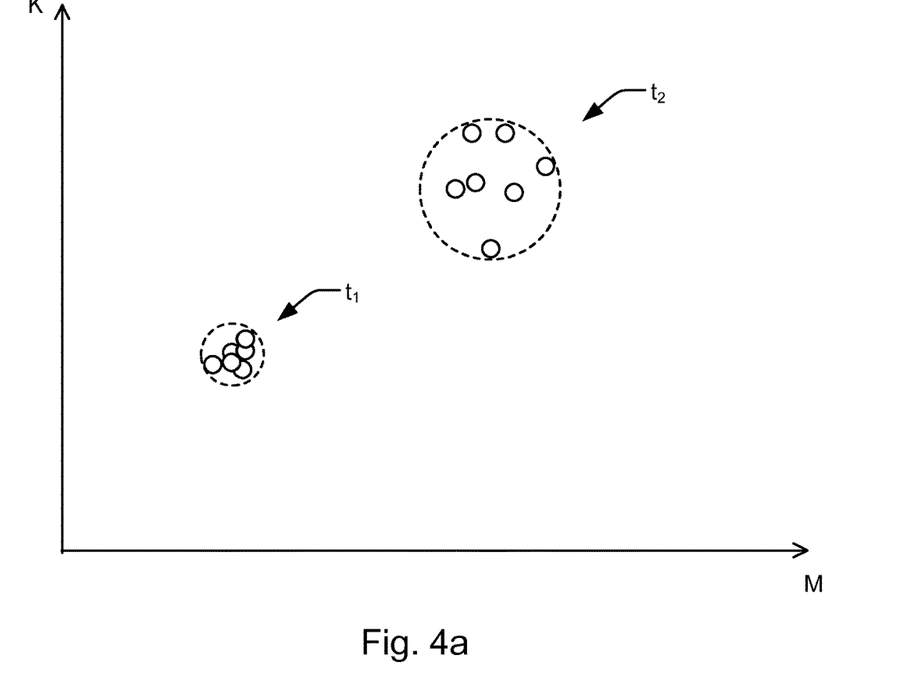
FIG. 4a is a diagram of coupled sets of condition parameters, where each set, i.e. data point, is determined as a measure of a central tendency of a distribution of the data values in FIG. 1 versus a quantified measure of a shape of such distribution, for two different times.
Figure 4B:
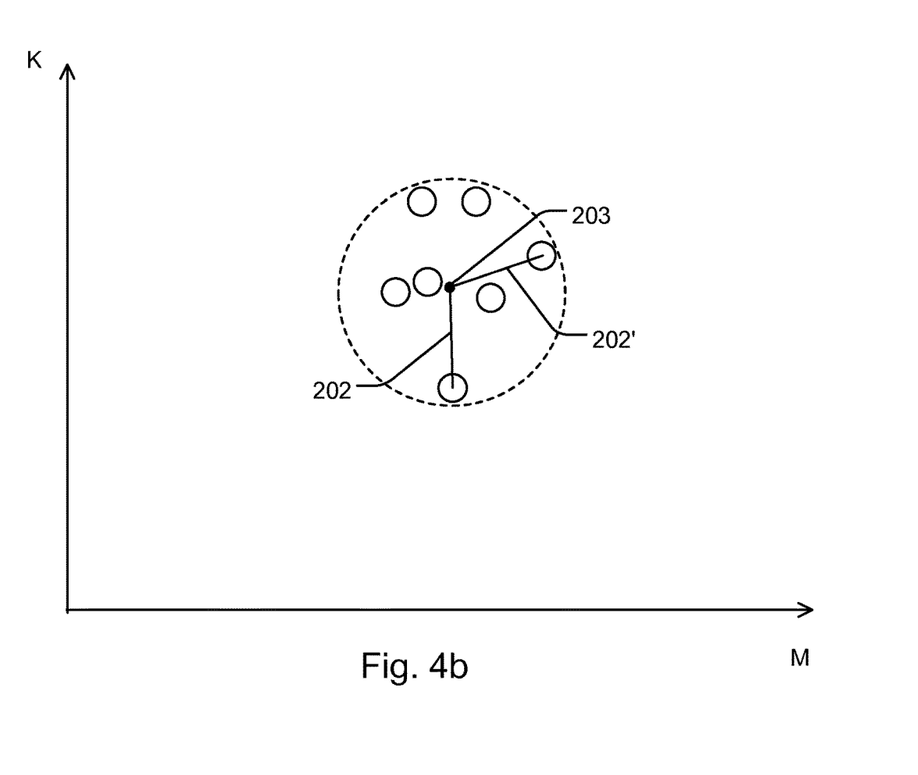
FIG. 4b is a magnified view of the coupled sets of condition parameters in FIG. 4a at time $t_2$.

Turning again to FIG. 1, the apparatus 200 comprises a sensor 204 configured to register 101 data values associated with the motion of the movable objects 301 along the track 303. FIGS. 2a-c show examples of such data values versus time, i.e. a position of the independently movable objects 301 on the track (2a), a velocity of the independently movable objects 301 (2b), a position error of the independently movable objects 301 (2c), and a current supplied to the track (2d). It is conceivable that the data values may comprise various other measurable characteristics of the motion of the independently movable objects 301, which can be registered by the sensor 204 for the purposes of carrying out the method 100, such as values of torque or any other force, vibration data, or acceleration associated with the movement. The apparatus 200 comprises a processing unit 201 configured to determine 102 a distribution of the data values and to calculate 103 a measure of central tendency of the data values in the distribution. FIG. 3 shows an example of a distribution of data values, in this case amplitude of a movement such as a vibrational movement as function of time. The measure of central tendency should be construed according to the normal meaning of the term within statistical theory, i.e. as a central or typical value for a probability distribution, e.g. for the distribution illustrated in the example of FIG. 3. The processing unit 201 is configured to calculate 104 a quantified measure of a shape of the determined distribution. Also, the shape of the distribution should be construed according to the normal meaning of the term within statistical theory, i.e. describing the shape of the curvature of the distribution in FIG. 3, such as the characteristics of the tails of such distribution, e.g. how wide or thin the tails of the distribution are, which is influenced by the number of outliers of the data points, i.e. the number of data points being far removed from the main distribution around the center of the distribution. The processing unit 201 is configured to associate 105 the measure of central tendency with the aforementioned quantified measure as a coupled set of condition parameters. I.e. for each motion cycle, a set of condition parameters is determined, where each set is a pair of data points comprising the measure of central tendency and the quantified measure of the shape of the distribution. FIGS. 4a-b are schematic diagrams where each data point (small circles with solid lines) correspond to a coupled set of condition parameters. The quantified measure of the shape of the distribution is given on the vertical axis (K), and the measure of central tendency is given on the horizontal axis (M). The processing unit 201 is configured to determine 106 a degree of dispersion of a plurality of coupled sets of condition parameters associated with a plurality of motion cycles of the independently movable objects. The dispersion is indicative of how far each of the coupled sets of condition parameters are removed from each other. In the example of FIG. 4a, the plurality of coupled sets of condition parameters have been determined for two points in time, $t_1$ and $t_2$. At time $t_2$ the degree of dispersion is larger than at time $t_1$. The processing unit 201 is configured to compare 107 the degree of dispersion with a dispersion threshold value, or determine 108 a trend of the degree of dispersion over time, for the fault prediction. An exceeded threshold value can thus be indicative of increased wear of the independently movable object 301. Alternatively, a trend of the degree of dispersion over time can be determined 108, for said fault prediction. For example, a trend of increased dispersion, going from $t_1$ to $t_2$, can be indicative of increased wear of the independently movable object 301.

Thus, by associating 105 the measure of central tendency with the quantified measure of the shape as a coupled set of condition parameters, and determining the degree of dispersion thereof for a plurality of motion cycles, a facilitated and reliable indication of increased wear, or a generally faulty independent movable object 301, can be obtained. E.g. complex frequency analysis of the movement characteristics of the component is not necessary. The various assumptions made in such traditional frequency analysis are thus not needed, and the method of fault prediction described in the present disclosure can be employed to achieve a reliable condition monitoring in a wide variety of applications. The apparatus 200 and related method 100 provides for a method of fault prediction having short execution time and thereby enabling analysis on-the-fly and generally a less time-consuming trouble-shooting of the independently movable objects 301, and also for other machine components such as bearings, belts, motors and related components thereof. Such improved fault prediction may be particularly advantageous in filling machines, and related components thereof, in high-speed production lines where condition monitoring is critical for maintaining a high throughput.

FIG. 5a illustrates a flow chart of a method 100 of fault prediction in a packaging machine 300 having independently movable objects 301 configured to manipulate packaging containers. The order in which the steps of the method 100 are described and illustrated should not be construed as limiting and it is conceivable that the steps can be performed in varying order. The method 100 comprises registering 101 data values associated with the motion of the movable objects along the track, determining 102 a distribution of said data values, calculating 103 a measure of central tendency of the data values in the distribution, calculating 104 a quantified measure of a shape of the distribution, associating 105 the measure of central tendency with said quantified measure of the shape as a coupled set of condition parameters, determining 106 a degree of dispersion of a plurality of coupled sets of condition parameters associated with a plurality of motion cycles of the independently movable objects, and comparing 107 the degree of dispersion with a dispersion threshold value, or determining 108) a trend of the degree of dispersion over time, for said fault prediction.

The method 100 thus provides for the advantageous benefits as described above in relation to the apparatus 200 with reference to FIGS. 1-4. I.e. the method 100 provides for a facilitated and reliable condition monitoring and fault prediction with indication of increased wear, or generally faulty machine components, without the need for complex frequency analysis of the movement characteristics of the components.

The sensor 204 may be configured to register the data values as a current supplied to the track for moving the independently movable objects 301 along the track 303. This may provide for an advantageous indicator of malfunction or wear since the current is linked to the force required to overcome the friction of the track 303 and propel the independent movable objects 301 in the desired direction. As the wear increases, the force required to move the objects 301 may increase, as well as the current supplied to the track 301 to move the particular object 301. It may be advantageous to determine the current for a movement on a straight portion of the track 303, where forces such as centrifugal forces are limited, and when the related movable object 301 has a constant velocity. This provides for facilitated isolation of the contribution of the wear of the components. The sensor measurements may be performed with an initial determination of a base line of the obtained data values. Subsequent measurements may then be compared to such base line of data values.

As mentioned above in relation to FIGS. 2a-d, the sensor 204 may be configured to register the data values as vibration data, and/or acceleration data, and/or velocity data of the movement of the independently movable objects along the track 301. The sensor 204 may also register other types of data that may characterize the motion of the objects 301. E.g. the sensor 204 may comprise a microphone that records the sound of the movement or induced by the movement. Increased wear of the moving components may lead to the generation of sound that is characteristic of an impending fault or breakdown. The sensor 204 may comprise an infrared sensor, i.e. an infrared camera that is configured to receive image data being indicative of the temperature of the independently movable objects 301. This provides for identification of any overheating movable object 301 which may indicate increased friction and wear.

Further, the sensor 204 may be configured to register the data values as position error values. The position error values are associated with a difference between a set position of a selected independently movable object 301 on the track 303 and an actual position of said selected independently movable 301 on the track 303. The position error value may for example be the time required to move the selected movable object 301 from the actual position to the set position on the track 303. In case a fault has occurred or wear is increasing, the difference between the actual position and the set position may increase, as well as the time required to compensate movement for such errors.

The sensor 204 may be configured to receive data values from the track 303. The sensor 204 may for example be mounted close to the track 303 to receive vibration data from the track 303 when the objects 301 move. The sensor 204 may comprise a plurality of sensor units positioned at various locations around the track 303 to provide such data. As mentioned further below, the processing unit 201 may be configured to register the data values at a defined time interval when a selected independently movable object 301 passes a defined location of the track 303. It is thus possible to track the behavior of a specific independently movable object 301.

Alternatively, or in addition, the sensor 204 may be attached to the independently movable objects 301. This is schematically indicated in FIG. 1 by a secondary sensor unit 204' attached to one of the movable objects 301. The secondary sensor unit 204' may send data as it moves along with the movable object 301 on the track 303, and send data comprising any of the above mentioned characteristics, such as acceleration of the movable object 301. The sensor 204' may be powered by energy supplied to the track 303 or by an onboard power supply such as a battery. It is also conceivable that the sensor 204' may be powered by an energy harvesting system that generates energy from e.g. the vibration of the independently movable object 301 over a time period. For example, power may be accumulated with onboard capacitors, and thereafter utilized to transmit the data at defined intervals to a static receiver.

The data recorded by the sensor 204 attached to a specific movable object 301 may also be used as a signature or fingerprint of the movement at a specific point in time, which later can be compared to subsequent data collected for that specific movable object 301, in order to foresee a possible degraded health status.

It is also conceivable that additional sensor units may be mounted to other parts of the machine 300 to register motion characteristics of such parts that may influence the data retrieved from the independent movable objects 301. The data registered from the independently movable objects 301 may thus be isolated by subtracting the contribution from the other moving parts, hence improving the signal to noise ratio.

Figure 5B:
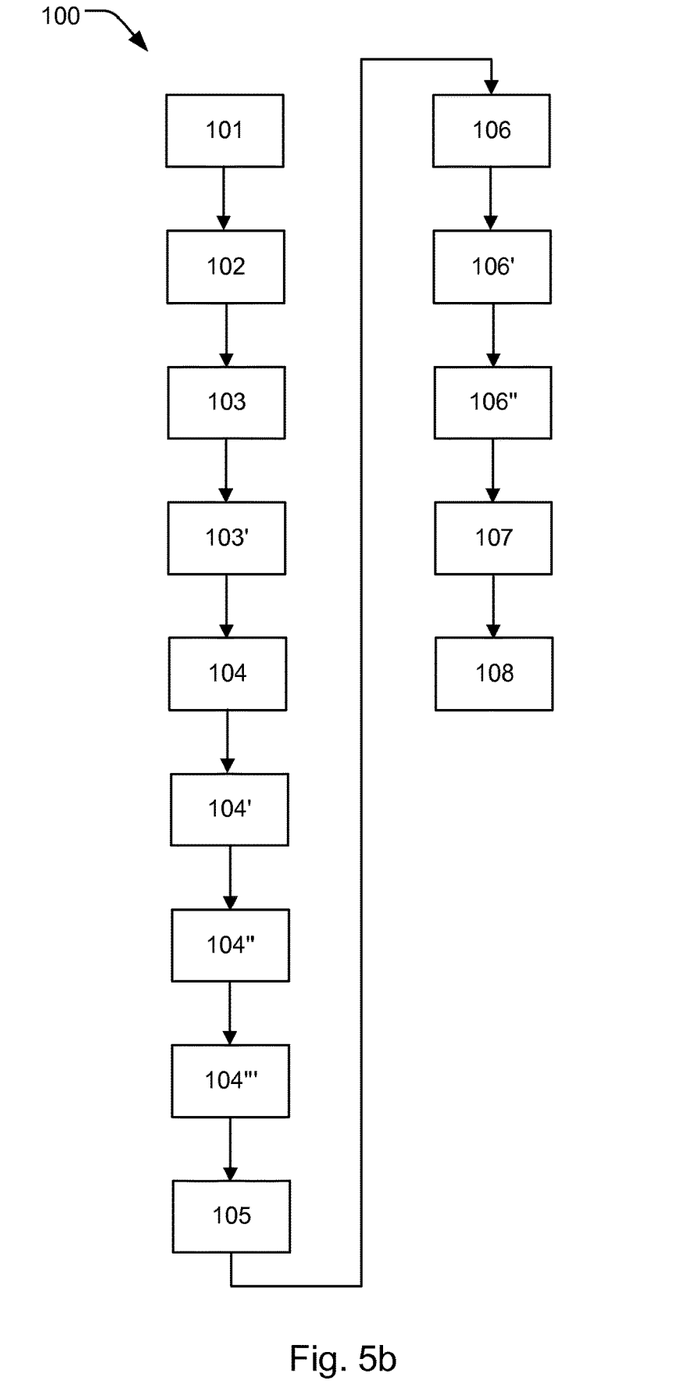
FIG. 5b is a flowchart of a method of fault prediction in a packaging machine.

FIG. 5b illustrates a further flow chart of a method 100 of fault prediction of a cyclically moving machine component. The order in which the steps of the method 100 are described and illustrated should not be construed as limiting and it is conceivable that the steps can be performed in varying order.

The data values may be registered at a defined time interval when a selected independently movable object 301 passes a defined location of the track 303. Hence, it is possible to isolate the contribution from a specific movable object 301. The control unit 302 may thus be configured to send data to the sensor 204 and/or the processing unit 204 to synchronize the position of a specific movable object 301 to the currently recorded sensor data.

As mentioned above, the data values may comprise vibration data, and/or acceleration data, and/or velocity data of the independently movable objects 301, and/or a current supplied to the track 303 for moving the independently movable objects 301 along the track 303.

Calculating a measure of central tendency the data values in the distribution may comprise calculating 103' a mean value, such as an arithmetic mean, and/or a geometric mean such as a quadratic mean (RMS), and/or a harmonic mean, and/or a generalized mean, and/or other measures of a central tendency of the distribution such as a median value or a mode value, and/or differently weighted and/or truncated variants thereof. The method 100 may be optimized to various applications depending on the particular measure of central tendency employed. An efficient condition monitoring and fault prediction can thereby be achieved for a range of applications and movement characteristics.

Calculating a quantified measure of a shape of said distribution may comprise calculating 104' a measure of a distribution of the data values around the measure of central tendency. Thus, the shape of the distribution around the measure of central tendency is determined, which subsequently is associated with the latter for providing the set of coupled condition parameters for the particular motion cycle.

Calculating a measure of a distribution of the measured data values around said measure of central tendency may comprise calculating 104" a measure of a deviation from a standard normal distribution. This will provide a measure of how the shape of the distribution is different from a standard normal distribution, e.g. if the tails of the distribution are thicker—i.e. more concentrated towards the measure of central tendency—or thinner tails—i.e. in a more even "low-profiled" distribution with a greater spread around the measure of central tendency. The shape of the distribution can thus be considered as a measure that describes the shape of the distribution's tails in relation to its overall shape.

Calculating a quantified measure of a shape of the distribution may comprise calculating 104''' a kurtosis value of the distribution. Thus, kurtosis is such a measure of the shape of the distribution. There are typically three categories of kurtosis that can be displayed by a set of data. All measures of kurtosis can be compared against a standard normal distribution, or bell curve. The first category of kurtosis is a mesokurtic distribution. This type of kurtosis is the most similar to a standard normal distribution in that it also resembles a bell curve. However, a graph that is mesokurtic has fatter tails than a standard normal distribution and has a slightly lower peak. This type of kurtosis is considered normally distributed but is not a standard normal distribution. The second category is a leptokurtic distribution. Any distribution that is leptokurtic displays greater kurtosis than a mesokurtic distribution. Characteristics of this type of distribution is one with thicker tails and a substantially thin and tall peak. The other type of distribution is a platykurtic distribution. These types of distributions have slender tails and a peak that's smaller than a mesokurtic distribution. Other measures of the shape of the distribution may be determined, such as the skewness describing asymmetry from the normal distribution in a set of data. The method 100 may be thus optimized to various applications depending on the particular measure of the shape of the distribution employed.

Determining 106 a degree of dispersion of the plurality of coupled sets of condition parameters may comprise determining 106' a fraction of the plurality of coupled sets of condition parameters being contained within a set threshold dispersion. The threshold dispersion may be illustrated as a circle, having a particular radius (R), in which a predetermined amount of the coupled sets of condition parameters (i.e. the data points in FIGS. 4a-b) should be contained. In the example of FIG. 4a, 100% of the data points are contained within the respective circles at times $t_1$ and $t_2$, since the radius has been increased at $t_2$ to accommodate the increased degree of dispersion. If the radius is kept fixed, however, over time, the fraction of data points contained within the radius will decrease. An acceptable range in the fraction of the data points to be contained within the defined radius may thus be set. Alternatively, a fixed fraction of data points to be contained may be defined, where the respective radiuses fall within a range.

Determining a degree of dispersion of the plurality of coupled sets of condition parameters may comprise determining 106" the distances 202, 202', between a center 203 of a distribution of the plurality of coupled sets of condition parameters and each coupled set of condition parameters. FIG. 4b schematically illustrates how the distances 202, 202', to two different data points, i.e. coupled sets of condition parameters, have been determined with respect to a determined center 203 of the distribution. The distance may thus be an Euclidian distance between the aforementioned points. It is conceivable however that other measures of the dispersion of the data points may be utilized.

The degree of dispersion may be determined by calculating the spread of the interquartile range (IQR, IQR') of the coupled sets of condition parameters. E.g. an increase in the interquartile range, i.e. a spread in the range of radiuses in which 25-75% of the data points are contained may be shown. Thus, as the dispersion increases the interquartile range IQR' is increased, providing for an efficient measure of the dispersion of the coupled sets of condition parameters.

A computer program product is provided comprising instructions which, when the program is executed by a computer, cause the computer to carry out the steps of the method 100 as described above in relation to FIGS. 1-5.

The processing unit 201 may be configured to calculate the measure of central tendency of the data values in the distribution by calculating 103' a mean value, such as an arithmetic mean, and/or a geometric mean, and/or a harmonic mean, and/or a generalized mean such as a quadratic mean (RMS), and/or other measures of a central tendency of the distribution such as a median value or a mode value, and/or differently weighted and/or truncated variants thereof.

The processing unit 201 may be configured to calculate a quantified measure of a shape of said distribution by calculating 104''' a kurtosis value of the data distribution.

The processing unit 201 may be configured to determine the degree of dispersion of the plurality of coupled sets of condition parameters by calculating 106' a fraction of the plurality of coupled sets of condition parameters being contained within a set threshold dispersion.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A method of fault prediction in a packaging machine comprising independently movable objects configured to manipulate packaging containers, the independently movable objects communicating with a control unit configured to control positions of the independently movable objects along a track, the method comprising:
   by one or more sensors, registering data values associated with a motion of the independently movable objects along the track,
   determining a distribution of said data values,
   calculating a measure of central tendency of the data values in the distribution,
   calculating a quantified measure of a shape of the distribution,
   associating the measure of central tendency with said quantified measure of the shape as a coupled set of condition parameters,
   determining a degree of dispersion of a plurality of coupled sets of condition parameters associated with a plurality of motion cycles of the independently movable objects,
   comparing the degree of dispersion with a dispersion threshold value, or determining a trend of the degree of dispersion over time, for said fault prediction, and
   indicating a fault in the packaging machine and causing repair of the packaging machine in response to:
      determining that the degree of dispersion satisfies the dispersion threshold value, or
      determining that the degree of dispersion at first time is smaller than the degree of dispersion at a second time subsequent to the first time.

2. The method according to claim 1, wherein calculating a measure of central tendency the data values in the distribution comprises:
   calculating a mean value, such as an arithmetic mean, and/or a geometric mean, and/or a harmonic mean, and/or a generalized mean, and/or other measures of a central tendency of the distribution such as a median value or a mode value.

3. The method according to claim 1, wherein calculating a quantified measure of a shape of said distribution comprises:
   calculating a measure of a distribution of the data values around said measure of central tendency.

4. The method according to claim 3, wherein calculating a measure of a distribution of the measured data values around said measure of central tendency comprises:
   calculating a measure of a deviation from a standard normal distribution.

5. The method according to claim 1, wherein calculating a quantified measure of a shape of said distribution comprises:
   calculating a kurtosis value of said distribution.

6. The method according to claim 1, wherein the data values comprises vibration data, and/or acceleration data, and/or velocity data of the independently movable objects, and/or a current supplied to the track for moving the independently movable objects along the track.

7. The method according to claim 1, wherein the data values are registered at a defined time interval when a selected independently movable object passes a defined location of the track.

8. The method according to claim 1, wherein determining a degree of dispersion of the plurality of coupled sets of condition parameters comprises:
   determining distances between a center of a distribution of the plurality of coupled sets of condition parameters and each coupled set of condition parameters.

9. A system comprising a packaging machine and an apparatus configured to predict fault in the packaging machine comprising independently movable objects configured to manipulate packaging containers, the independently movable objects communicating with a control unit configured to control positions of the independently movable objects along a track, the apparatus comprising:
   one or more sensors configured to register data values associated with a motion of the independently movable objects along the track, and
   a processing unit configured to:
      determine a distribution of said data values,
      calculate a measure of central tendency of the data values in the distribution,
      calculate a quantified measure of a shape of the distribution,
      associate the measure of central tendency with said quantified measure as a coupled set of condition parameters,
      determine a degree of dispersion of a plurality of coupled sets of condition parameters associated with a plurality of motion cycles of the independently movable objects,
      compare the degree of dispersion with a dispersion threshold value, or determine a trend of the degree of dispersion over time, for fault prediction, and
      indicate a fault in the packaging machine and causing repair of the packaging machine in response to:
         a determination that the degree of dispersion satisfies the dispersion threshold value, or
         a determination that the degree of dispersion at first time is smaller than the degree of dispersion at a second time subsequent to the first time.

10. The system according to claim 9, wherein the one or more sensors are configured to register said data values as a current supplied to the track for moving the independently movable objects along the track.

11. The system according to claim 9, wherein the one or more sensors are configured to register said data values as vibration data, and/or acceleration data, and/or velocity data of a movement of the independently movable objects along the track.

12. The system according to claim 9, wherein the one or more sensors are configured to register said data values as position error values associated with a difference between a set position of a selected independently movable object on the track and an actual position of said selected independently movable object on the track.

13. The system according to claim 9, wherein the one or more sensors are configured to receive data values from the track and/or be attached to the independently movable objects.

14. The system according to claim 9, wherein said processing unit is configured to calculate the measure of central tendency of the data values in the distribution by calculating a mean value, such as an arithmetic mean, and/or a geometric mean, and/or a harmonic mean, and/or a generalized mean, and/or other measures of a central tendency of the distribution such as a median value or a mode value.

15. The system according to claim 9, wherein said processing unit is configured to calculate a quantified measure of a shape of said distribution by calculating a kurtosis value of said distribution.

16. A non-transitory computer readable medium storing a computer program comprising instructions which, when executed by a computer, cause the computer to carry out the steps of the method according to claim 1.

17. The method according to claim 1, wherein the one or more sensors comprises at least one of:

a microphone configured to record a sound of a movement associated with the motion of an independently movable objects along the track or induced by the movement; or an infrared camera is configured to receive image data being indicative of a temperature of an independently movable object.

18. The system according to claim 9, wherein the one or more sensors comprises a microphone configured to record a sound of a movement associated with the motion of an independently movable objects along the track or induced by the movement.

19. The system according to claim 9, wherein the one or more sensors comprises an infrared camera configured to receive image data being indicative of a temperature of an independently movable object.

20. The system according to claim 9, wherein the one or more sensors comprises a first sensor mounted to an independently movable object and a second sensor mounted to another component of the packaging machine and configured to measure a motion data due to movement of components of the packaging machine other than the independently movable objects, and wherein the processing unit configured to remove the motion data from a data value associated with the motion of the independently movable object.

* * * * *

UNITED STATES PATENT AND TRADEMARK OFFICE
CERTIFICATE OF CORRECTION

PATENT NO. : 11,807,464 B2
APPLICATION NO. : 17/280815
DATED : November 7, 2023
INVENTOR(S) : Davide Borghi It is certified that error appears in the above-identified patent and that said Letters Patent is hereby corrected as shown below:

On the Title Page

Column 1 (item (56) Other Publications), Line 3, delete "Mike" and insert -- Mika --.

Page 2, Column 2 (item (56) Other Publications), Line 1, delete "Canerini" and insert -- Camerini --.

Page 2, Column 2 (item (56) Other Publications), Line 15, delete "Acousitcs," and insert -- Acoustics, --.

Page 2, Column 1 (item (56) Other Publications), Line 15, delete "2016," and insert -- 2013, --.

Page 2, Column 1 (item (56) Other Publications), Line 17, delete "algorith"," and insert -- algorithm", --.

In the Specification

Column 2, Line 5, delete "Is" and insert -- is --.

Column 5, Line 41, delete "108)" and insert -- 108 --.

In the Claims

Column 9, Line 46, Claim 2, delete "tendency the" and insert -- tendency of the --.

Signed and Sealed this
Thirtieth Day of January, 2024

Katherine Kelly Vidal
*Director of the United States Patent and Trademark Office*